US008027658B2

(12) United States Patent
Suryanarayana et al.

(10) Patent No.: US 8,027,658 B2
(45) Date of Patent: Sep. 27, 2011

(54) ENHANCED EMERGENCY SERVICE PROVIDER

(75) Inventors: Lalitha Suryanarayana, Austin, TX (US); Sreenivasa Rao Gorti, Austin, TX (US); Michael F. Grannan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 174 days.

(21) Appl. No.: 11/010,180

(22) Filed: Dec. 10, 2004

(65) Prior Publication Data

US 2006/0128357 A1    Jun. 15, 2006

(51) Int. Cl.
*H04M 11/04* (2006.01)
(52) U.S. Cl. ............... 455/404.1; 455/404.2; 379/45
(58) Field of Classification Search .......... 379/37, 379/45; 455/404.2, 404.1
See application file for complete search history.

(56) References Cited

U.S. PATENT DOCUMENTS

| | | | |
|---|---|---|---|
| 5,029,290 A * | 7/1991 | Parsons et al. ............ 340/533 |
| 5,761,278 A * | 6/1998 | Pickett et al. ............... 379/45 |
| 5,805,670 A * | 9/1998 | Pons et al. .................. 379/45 |
| 5,926,526 A | 7/1999 | Rapaport et al. |
| 6,463,417 B1 | 10/2002 | Schoenberg |
| 6,477,362 B1 * | 11/2002 | Raith et al. ............. 455/404.1 |
| 6,563,910 B2 * | 5/2003 | Menard et al. ............... 379/45 |
| 6,600,812 B1 * | 7/2003 | Gentillin et al. ............. 379/45 |
| 7,130,630 B1 * | 10/2006 | Enzmann et al. ......... 455/435.1 |
| 7,149,774 B2 * | 12/2006 | Zellner et al. ............ 709/203 |
| 2002/0027975 A1 | 3/2002 | Oxley ........................ 379/45 |
| 2002/0057340 A1 * | 5/2002 | Fernandez et al. ......... 348/143 |
| 2002/0120470 A1 * | 8/2002 | Trice, Sr. ..................... 705/3 |
| 2003/0012344 A1 * | 1/2003 | Agarwal et al. ............. 379/37 |
| 2004/0001572 A1 * | 1/2004 | Chin et al. .................. 379/45 |
| 2005/0014485 A1 * | 1/2005 | Kokkonen et al. ......... 455/411 |
| 2005/0063519 A1 * | 3/2005 | James ......................... 379/45 |
| 2005/0079820 A1 * | 4/2005 | Yamashita ............... 455/41.2 |
| 2005/0083911 A1 * | 4/2005 | Grabelsky et al. ......... 370/352 |
| 2005/0089150 A1 | 4/2005 | Birkhead et al. |
| 2005/0190721 A1 * | 9/2005 | Pershan .................... 370/328 |
| 2005/0262564 A1 * | 11/2005 | Roskind ..................... 726/22 |
| 2006/0036619 A1 * | 2/2006 | Fuerst et al. ............... 707/100 |
| 2006/0068753 A1 * | 3/2006 | Karpen et al. ........... 455/404.2 |
| 2006/0077903 A1 | 4/2006 | Hiltunen |
| 2006/0195338 A1 * | 8/2006 | Seibel et al. ................. 705/1 |
| 2006/0218152 A1 | 9/2006 | Coveley et al. |
| 2006/0252998 A1 | 11/2006 | Kimbrell |

OTHER PUBLICATIONS

ICE Services, "ICE Can Save your Life: Worldwide Emergency and Medical Notification Services," www.icecontact.com, 2005 (2 pages).

* cited by examiner

*Primary Examiner* — Charles Appiah
*Assistant Examiner* — Mazda Sabouri
(74) *Attorney, Agent, or Firm* — Toler Law Group

(57) ABSTRACT

A service enhancement to emergency-911 capability involves a new entity termed an EESP which implements and operates a system that communicates subscriber-specific emergency information portably linked to subscriber identity in a timely fashion to emergency care providers.

24 Claims, 1 Drawing Sheet

ENHANCED EMERGENCY SERVICE PROVIDER

FIELD OF THE INVENTION

The present invention relates generally to mobile communications and, in particular, to a method for enhanced emergency information access in a Public Switched Telephone Network (PSTN).

BACKGROUND OF THE INVENTION

U.S. Pat. No. 6,574,484 B1, issued Jun. 3, 2003, to Carley ('484 patent) discloses a method for emergency service information access via a wireless telephone. The '484 patent, however, fails to disclose subscriber emergency information available across various different telecommunications platforms and architectures, including VoIP, and fails to associate subscriber identity to subscriber emergency information independently of the communication device, network, or platform, used to access the subscriber information.

Security system and home monitoring providers such as ADT offer subscriber's security and emergency services based on proprietary methods that do not tie into E-911 calls in the telephone/VoIP network. Through proprietary security systems in the home, a call may be triggered to a security provider, who then contacts an emergency care provider on behalf of the user as deemed necessary.

Emergency solutions provided by home monitoring providers such as Brinks offer a two-step process in which the service dials for medical or fire assistance on behalf of the user. The service, however, does not extend to roadside emergency assistance such as required in a traffic accident. On the other hand, telematics providers, such as GM's Onstar®, assist with roadside emergency automatically for cases when airbags get deployed. These and similar services are specialized, niche services that do not encompass all emergency or non-emergency situations, may or may not federate emergency data and do not work implicitly with every 911 call from any device over any network.

An Enhanced Emergency Service Provider (EESP) and an enhanced emergency information service as provided by the present invention has not been described or implemented in the PSTN or an IP based environment. From a subscriber standpoint, the lack of an EESP requires that an individual subscribe to multiple services (such as ADT, Onstar, and the like) to avail the same benefits as the invention. Various embodiments of the invention are selectively realized in a variety of architectural options in the PSTN and VoIP worlds, including wireline, wireless or data environments.

There is a need, therefore, for systems, methods and services to portably access subscriber emergency information, and to correlate subscriber identity with subscriber emergency information, independently of the communication device, network, or platform.

BRIEF DESCRIPTION OF THE DRAWINGS

The present invention is further described in the detailed description that follows, by reference to the noted drawing, by way of non-limiting examples of embodiments of the present invention, and in which.

DETAILED DESCRIPTION OF THE INVENTION

Figure 1:
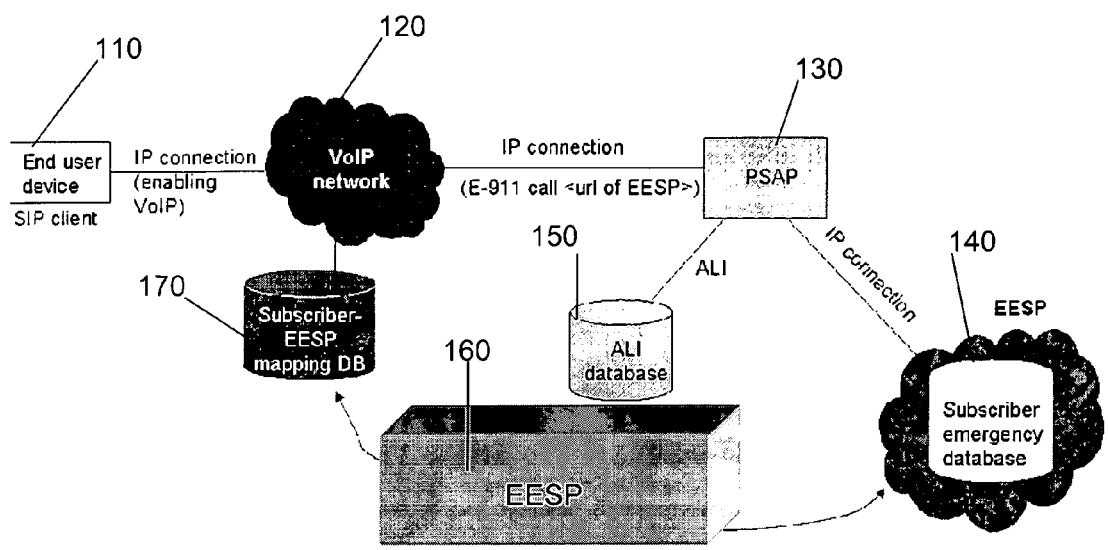
FIG. 1 is a schematic block diagram of a specific exemplary embodiment of an EESP system of the present invention.

In view of the foregoing, the present invention, through one or more of its various aspects, embodiments and/or specific features or sub-components, is intended to bring out one or more of the advantages that will be evident from the description. The present invention is described with frequent reference to phones or cell phones. It is understood that a phone is merely an example of a specific embodiment of the present invention, which is directed broadly to databases, communication terminals (including internet access devices), portable and mobile communication equipment and devices, together with attendant networks, systems and methods within the scope of the invention. The terminology, therefore, is not intended to limit the scope of the invention.

The present invention provides a service enhancement to emergency-911 capability. The enhancement involves a new entity termed an EESP which implements and operates a system that communicates subscriber-specific emergency information portably linked to subscriber identity in a timely fashion to emergency care providers. Such information may include:

Contact information regarding next of kin/family member who should be notified in case of emergency.

Auto or medical insurance and other logistics data including name and contact of provider, member ID, doctor and hospital preferences, and the like.

Specific medical or dental records regarding allergies, blood type, current medical conditions, previous history and so forth, or a link, optionally encrypted in certain embodiments, to patient records in a third party online system, such as, for example, a system held by a hospital or doctor.

The EESP acts on behalf of a subscriber to maintain and distribute the information, and while honoring security, privacy and control preferences of the subscriber as to when and how the information is to be disseminated in case of an emergency. A network service provider (NSP) or a trusted third party, in particular embodiments, fills the role of the EESP and offers the enhanced service of the invention to end users or subscribers.

FIG. 1 is a schematic block diagram of a specific embodiment of an EES system of the present invention. End user device 110, which includes a Session Initiation Protocol (SIP) client in certain specific embodiments, connects to a Voice over Internet Protocol (VoIP) network 120 via an Internet Protocol (IP) connection, which enables VoIP communication. The IP connection protocol is SIP, DOCSIS/PacketCable, Simple Object Access Protocol (SOAP), HTTP, or other suitable means, depending on the particular embodiment of the invention selected by the user or the device.

During an emergency, the EESP subscriber makes an emergency (911) call. The end user device 110 launches the call and the VoIP network 120 routes the call to the closest PSAP 130 for emergency treatment. In doing so, the VoIP network checks the Subscriber EESP mapping database 170 to obtain the EESP information, appends this to the call information and routes the call to the closest PSAP. The PSAP first queries the Automatic Line Information (ALI) database 150 to obtain physical location of the caller. The PSAP also detects that the end user is an EESP subscriber, and therefore queries the Subscriber Emergency Database 140 to obtain the necessary emergency information. This information is then passed on to the emergency care provider (fire, medical, and the like) based on the user's privacy and security settings.

An exemplary architecture of the invention provides the following elements:

1. An EESP entity 160 that maintains a subscriber emergency database 140 that includes relevant emergency information as well as subscriber preferences and permissions to control use of the information. EESP 160 may charge the subscribers a monthly recurring fee and/or fee every time EESP 160 forwards or federates information to emergency care providers on behalf of the subscriber.

2. Means 170 to allow a VoIP Network Service Provider 120 to associate the EESP 160 with a particular caller:

a. Specific embodiments provide a VoIP NSP 120 which maintains a cross reference database 150 that identifies all subscribers who have subscribed to an EESP service. For example, in the case of VoIP architecture, Joe Smith subscribes to enhanced emergency service provided by ABC and the URL link to ABC is http://abc.com/EESP/ with customer id <xyz123>. The NSP stores and maintains information from all EESPs in a common Electronic Numbering (ENUM) database.

b. Another embodiment, particularly well suited to more powerful SIP clients, provides an end user client device 110 that maintains a profile which identifies a specific EESP 160. The client directly forwards the information to the NSP 120 as part of a Session Initiation Protocol (SIP) INVITE for an emergency call.

c. In a third embodiment, suitable in an Advanced Intelligent Network (AIN)-based circuit switched (wireline/wireless) environment, the EESP information takes the form of an id (EESP id) which is queried from the AIN Service Control Point on an AIN trigger based on calling party number and dialed number (911), and appended to the call or signaling information when the call is routed to the PSAP.

AIN is a network architecture that separates service logic from switching equipment. It allows new services to be added without having to redesign the switches to support the new services. Among the early new services made possible by AIN was Local Number Portability (LNP).

Two of the key components of the AIN architecture are the switch, known as the Switching Service Point (SSP), and the Service Control Point (SCP), where the network service logic and control are located. The network connection used to route the data needed to set up and manage AIN network calls is known as SS7. SS7 is an international standard, out-of-band, signaling protocol.

d. For an embodiment for a standard Plain Old telephone System (POTS) 911 call, the Automatic Number Identification (ANI, or caller ID) is used to query an EESP database 140. Under a "family" subscription embodiment, it is possible that each member of the family has a separate record (in other words is a separate subscriber) at the EESP. An emergency call from a home telephone supplies the ANI that is common to all family members. This ANI by itself is inadequate to identify the exact family member (subscriber) whose emergency information must be shared In a situation of this embodiment, the medical provider may need to select the household member requiring medical care based on other aspects of subscriber identity.

3. A communication means for a VoIP NSP 120 to route an emergency call to the PSAP 130 and to also pass information about the EESP 160 to which the caller is a subscriber. For example:

a. In the case of a SIP-based VoIP call, an NSP-hosted SIP Proxy or the end user SIP client sends a URL identifying the EESP 160 and other associated information as part of the SIP signaling (part of the SIP body) itself (in other words, in-band).

b. An out of band query on an emergency call to a third party database 150 to lookup subscription information regarding the EESP 160 for the caller. The information is optionally appended to the ALI query or is transmitted independently of the query.

4. A communication means for the PSAP or emergency care provider to query the specific EESP for subscriber-specific data in an emergency. A Web Service invocation to the endpoint indicated by the EESP URL is an example of such a means.

Subscriber or end user information is accessible by Emergency Service Technicians at the time of a 911 call and/or by hospital or other medical provider(s) once the patient has arrived at a health care or other facility (e.g., hospital or doctor's office).

The EESP database of the invention is exposed to subscribers for profile management and permissions settings, and to medical providers to query for information on patients who are subscribers, via a web interface. In addition, the system optionally supports call-in via a standard circuit switched phone to access the patient's medical information through an interactive voice response (IVR) system or voice activated or multimodal user interface.

Since the data is sensitive in nature, the subscriber provides explicit instructions on when, how and to what extent the data can be used or shared with emergency care providers. The preferences, conditions and permissions ensure and maintain the highest security and privacy along the chain of access. The information is time-sensitive in specific embodiments, so that access to this information expires after a specified event or selected time duration.

For example, medical information is shared with the nearest hospital only if the doctor or immediately family cannot be reached. Parents sending their child to a day camp, for instance, optionally permit access to emergency information regarding their child with specified personnel by explicit consent that is valid only for a specific time period. Technology advances such as encryption, Security Assertion Markup Language (SAML), time sensitive passcodes or keys, and so forth, are contemplated to ensure data and system security and privacy.

To ensure that the subscriber data is up-to-date, subscriber records are optionally populated with emergency data by means of manual or automatic entry. Data is thereby updated regularly to reflect any changes the subscriber may desire. For example, the EESP sends periodic alerts (e.g., by e-mail) to subscribers to review and maintain current their emergency information. Alternately, the user has secure access to the information via web, IVR or multimodal interface from any device. In particular embodiments, the data is also automatically validated against other online systems such as insurance information or government information. Technologies such as XML are well suited for such transactions.

Support for multiple users is provided in various embodiments of the invention. If caller ID information is used as the "key" to the EESP database, for example, profiles for multiple family members and other of subscriber's designees are stored in the database. Once the EESP database is accessed the invention prompts the medical provider to select the name or ID of the actual patient.

Support for multiple devices/phone numbers or other network addresses is contemplated by the invention. An EESP subscription (and thus subscription data) is associated with multiple phone numbers and devices. Logical and/or physical association is made between the subscription and various devices, since, for example, VoIP allows for virtual phone numbers. Further, the user optionally chooses to associate the subscription to an emergency call from a number, device or network in one or more different ways, including:

A unique number or ID or address associated with a device (e.g., phone number, IMSI/ESN, MAC address, IP address, etc.), so the device is automatically associated with a subscription.

Smart card or RF-ID chip which is portable across devices and numbers. The EESP subscription is associated with unique, and optionally encrypted, information stored on the smart card. This also facilitates access to the EESP database for users carrying such identity devices on their person in case of an emergency when a 911 call is not placed.

A unique combination of personal data such as driver's license, social security number and password is used to look up subscriber information.

A temporary URL or system generated encrypted key passed in-band with the call (e.g., dynamically generated by the SIP client).

Providers of various web applications and services such as electronic commerce support identity federation services. The present invention contemplates, in some of its alternative embodiments, federation of emergency information. Additionally, the present invention contemplates an enhanced emergency service in a VoIP environment.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

We claim:

1. An enhanced emergency service comprising:
    a subscriber emergency database hosted by a service provider and including subscriber emergency information, wherein the subscriber emergency database comprises an identifier associated with each subscriber, and wherein two or more subscribers may be associated with a particular identifier;
    a validation module hosted by the service provider to automatically validate at least a portion of the subscriber emergency information of one or more subscribers against at least one of insurance information for the one or more subscribers and government information for the one or more subscribers; and
    a session initiation protocol proxy hosted by the service provider, wherein the session initiation protocol proxy sends a uniform resource locator identifying the subscriber emergency database as part of a session initiation protocol signaling message to a public safety answering position, wherein the uniform resource locator identifying the subscriber emergency database is received at the session initiation protocol proxy as part of a session initiation protocol invite message received from a session initiation protocol client.

2. The enhanced emergency service of claim 1, wherein the session initiation protocol client resides on a subscriber communication device, wherein a communications network is adapted to connect the subscriber communication device with an emergency care provider, wherein the communications network supports voice over internet protocol communication.

3. The enhanced emergency service of claim 2, wherein the subscriber communication device supports a smart card to provide portability of access to the subscriber emergency database across devices and networks on the basis of a subscriber identity associated with the subscriber communication device.

4. The enhanced emergency service of claim 1, wherein the subscriber emergency information is included in a federated database.

5. The enhanced emergency service of claim 1, wherein the subscriber emergency database is at least partially federated.

6. The enhanced emergency service of claim 5, wherein federation of the subscriber emergency database is based upon user-specified rules or preferences regarding privacy and sharing of information included in the subscriber emergency database.

7. The enhanced emergency service of claim 1, wherein a time sensitive passcode or key is used for access authorization to the subscriber emergency database wherein the time sensitive passcode or key is not a session key.

8. The enhanced emergency service of claim 1, further comprising an updating module to automatically update the subscriber emergency information.

9. The enhanced emergency service of claim 1, further comprising a radio component portable across communication devices to portably link a particular subscriber identity to particular subscriber emergency information.

10. A system to provide enhanced emergency service, the system comprising:
    at least one communications network element comprising a network service provider system adapted to:
        identify an enhanced emergency service provider associated with a device that initiates an emergency communication, wherein the enhanced emergency service provider maintains a subscriber emergency information database;
        determine an identifier of the subscriber emergency information database based on the device;
        determine whether the identifier is associated with more than one subscriber; and
        send a uniform resource locator identifying the subscriber emergency information database as part of a session initiation protocol signaling message to a public safety answering position, wherein the uniform resource locator identifying the subscriber emergency information database is received at a session initiation protocol proxy as art of a session initiation protocol invite message received from a session initiation protocol client.

11. The system of claim 10, wherein the at least one communications network element supports voice over internet protocol communication, and wherein the at least one communications network element further comprises a communications terminal having a resident session initiation protocol client.

12. The system of claim 10, wherein the at least one communications network element is adapted to route the emergency communication comprising information related to the enhanced emergency service provider to an emergency care provider, and wherein the at least one communications network element is further adapted to send an out of band query to a third party database to look up information related to the enhanced emergency service provider.

13. The system of claim 10, further comprising a cross reference database that identifies all enhanced emergency service provider subscribers for a network service provider to identify a particular enhanced emergency service provider associated with a particular subscriber identity.

14. The system of claim 10, wherein the at least one communications network element is accessible to a communication terminal that maintains a particular subscriber's profile identifying a particular subscriber's enhanced emergency service provider, and which has a resident session initiation protocol client, and wherein the particular subscriber's profile is provided to the network service provider system as part of a session initiation protocol invite for the emergency communication.

15. The system of claim 10, further comprising an interactive voice response system to update the subscriber emergency information database.

16. The system of claim 10, further comprising a voice activated user interface to update the subscriber emergency information database.

17. The system of claim 10, wherein the subscriber emergency information database is automatically updated and validated from other online information.

18. A method for providing an enhanced emergency service, the method comprising:
   receiving a voice over internet protocol call that includes a first identifier;
   correlating the first identifier with a first enhanced emergency service provider obtained from an enhanced service provider mapping database;
   determining whether the first identifier is associated with more than one subscriber; and
   sending a uniform resource locator identifying a subscriber emergency information database hosted by the first enhanced emergency service provider as part of a session initiation protocol signaling message to a public safety answering position, wherein the uniform resource locator identifying the subscriber emergency information database is received at a session initiation protocol proxy as part of a session initiation protocol invite message received from a session initiation protocol client.

19. The method of claim 18, further comprising:
   correlating a second identifier with a second enhanced emergency service provider provided by the enhanced service provider mapping database.

20. The enhanced emergency service of claim 1, further comprising a subscriber-enhanced emergency service provider mapping database accessible to a network service provider to identify the service provider associated with the identifier.

21. A system comprising:
   an emergency service provider system having access to at least one subscriber emergency information database and having access to a network to receive emergency calls from a subscriber, wherein the at least one subscriber emergency information database includes subscriber emergency information associated with the subscriber and access to the subscriber emergency information in the subscriber emergency information database for the subscriber is based upon specified rules or preferences retrievable from the subscriber emergency information database and relating to privacy and information sharing regarding when and how information is to be disseminated to emergency care providers;
   an interactive voice response system to receive information from the subscriber to update the subscriber emergency information for the subscriber; and
   a session initiation protocol proxy configured to send a uniform resource locator identifying the subscriber emergency information database as part of a session initiation protocol signaling message to a public safety answering position, wherein the uniform resource locator identifying the subscriber emergency information database is received at the session initiation protocol proxy as part of a session initiation protocol invite message received from a session initiation protocol client.

22. The system of claim 21, wherein the emergency service provider system has access to a subscriber-enhanced emergency service provider mapping database.

23. A method comprising:
   receiving an emergency call from a device associated with a plurality of subscribers;
   retrieving an enhanced emergency service provider identifier of an enhanced emergency service provider associated with the plurality of subscribers from a subscriber-enhanced emergency service provider mapping database in response to the emergency call; and
   sending a uniform resource locator identifying a subscriber emergency information database hosted by the enhanced emergency service provider as part of a session initiation protocol signaling message to a public safety answering position, wherein the uniform resource locator identifying the subscriber emergency information database is received at a session initiation protocol proxy as part of a session initiation protocol invite message received from a session initiation protocol client.

24. The method of claim 23, further comprising routing subscriber-specific emergency information from the subscriber emergency information database associated with the enhanced emergency service provider, to the public safety answering position, in response to a query received from the public safety answering position.

* * * * *